United States Patent
Beattie et al.

(10) Patent No.: US 6,561,127 B2
(45) Date of Patent: May 13, 2003

(54) BAIT WITH EXTENDED LONGEVITY USED IN TRAP FISHERY

(75) Inventors: Michael Beattie, St. Andrews (CA); Keith Were, St. George (CA); Greg Deacon, Vancouver (CA)

(73) Assignee: Nutreco Canada, Inc., Vancouver (CA)

( * ) Notice: Subject to any disclaimer, the term of this patent is extended or adjusted under 35 U.S.C. 154(b) by 0 days.

(21) Appl. No.: 09/996,075

(22) Filed: Nov. 28, 2001

(65) Prior Publication Data

US 2002/0088407 A1 Jul. 11, 2002

Related U.S. Application Data

(63) Continuation-in-part of application No. 09/724,795, filed on Nov. 28, 2000.

(51) Int. Cl.[7] ............................................. A01K 61/02
(52) U.S. Cl. ................ 119/51.04; 119/204; 119/51.01; 426/2
(58) Field of Search .............................. 119/204, 51.01, 119/51.04, 230, 242, 212; 426/2, 1; 43/42.06, 44.99

(56) References Cited

U.S. PATENT DOCUMENTS

| | | | | |
|---|---|---|---|---|
| 2,827,376 A | * | 3/1958 | Breuer | 426/1 |
| 3,410,689 A | * | 11/1968 | Nathan | 426/1 |
| 3,931,415 A | * | 1/1976 | Larsen et al. | 426/1 |
| 4,206,236 A | * | 6/1980 | Orth, Jr. | 426/1 |
| 4,576,821 A | * | 3/1986 | Smith et al. | 426/1 |
| 4,666,717 A | * | 5/1987 | Smith et al. | 426/1 |
| 4,809,455 A | * | 3/1989 | Smart | 43/4.5 |
| 4,826,691 A | * | 5/1989 | Prochnow | 424/84 |
| 5,135,744 A | * | 8/1992 | Alexander et al. | 424/409 |
| 5,173,316 A | * | 12/1992 | Heycott | 426/1 |
| 5,281,425 A | | 1/1994 | Stribling et al. | |
| 5,912,029 A | * | 6/1999 | Spickelmire | 424/405 |

FOREIGN PATENT DOCUMENTS

| | | |
|---|---|---|
| WO | WO85/05014 | 11/1985 |
| WO | WO86/06251 | 11/1986 |

* cited by examiner

*Primary Examiner*—Charles T. Jordan
*Assistant Examiner*—Judith A. Nelson
(74) *Attorney, Agent, or Firm*—John Russell Uren

(57) ABSTRACT

Bait for attracting crustaceans and non-crustaceans which are caught in trap fishery. The bait includes a pelletized carrier composed of ingredients intended for long life in sea water. The pelletized carrier is mixed with specific attractants depending on the desired catch and a fish oil is added to coat the pellets and attractant and to allow for the timed release of the attractant. In experiments to date, it has been found that the use of the pelletized carrier and attractant together with the fish oil coating has been effective as a bait in attracting catch and has an extended life within the traps.

18 Claims, 2 Drawing Sheets

BAIT WITH EXTENDED LONGEVITY USED IN TRAP FISHERY

CROSS-REFERENCE TO RELATED APPLICATION

This application is a continuation-in-part of application Ser. No. 09/724,795 filed Nov. 28, 2000.

INTRODUCTION

This invention relates to bait and, more particularly, to crustacean and non-crustacean bait which includes an attractant or attractants and which is intended to have an extended attractant life for lobsters, prawns, shrimp and other commercial fished catch in the trap fishery.

BACKGROUND OF THE INVENTION

Presently, fisherman in trap fishery utilise fresh or frozen fish parts or whole fish to bait traps used in that fishery. The fish used are traditionally herring, mackerel, red fish or salmon. The bait works in a satisfactory manner and lobsters and other crustaceans and non-crustaceans are duly attracted to the fish bait. However, there are disadvantages inherent in using fresh or frozen fish or fish parts in such traps.

First, fresh or frozen bait has a very short life within the traps. Salt water and other opportunistic scavengers will quickly deteriorate the quality of the bait and, after a relatively short period depending on the conditions under which the bait is used, the bait will no longer serve as an attractant because of its deterioration. Secondly, the handling of fresh or frozen bait is inconvenient. Fresh bait may not be available and, in any event, such bait must first be obtained if the traps are to be baited. Frozen bait will ensure availability but refrigeration is necessary to preserve the frozen bait which is energy consuming. Thirdly, the cost of fresh or frozen baits may vary substantially depending on the time of the fishing season and the availability of the fresh or frozen bait and such cost may sometimes be expensive. Fourthly, traditional baits must be obtained and this is sometimes done under directed fishing conditions in which the bait is frozen or salted prior to each fishing season. A reduced demand for fresh or frozen bait would be environmentally attractive, would enhance fish stocks and would allow more efficient use of scarce marine resources.

SUMMARY OF THE INVENTION

According to one aspect of the invention, there is provided bait for a trap used for catch in a trap fishery, said bait comprising a pelletized carrier and attractant having ingredients which offer extended life relative to a non-pelletized fish feed, said ingredients forming a pelletized feed, an attractant for attracting said catch of crustaceans and/or non-crustaceans and an oil coating for coating said pellets and said attractant, said oil coating allowing a timed release of said attractant thereby to attract said catch.

According to a further aspect of the invention, there is provided a method for attracting desired catch to a trap used in crustacean and non-crustacean trap fishery comprising the steps of obtaining a pelletized crustacean bait consisting of a carrier made from relatively long life ingredients, at least one attractant for said catch mixed with said pelletized bait and an oil coating allowing timed release of said attractant, placing said bait within said trap and setting said trap within water for attracting and trapping said crustaceans and/or non-crustaceans.

According to yet a further aspect of the invention, there is provided a method of making a bait used in attracting catch in trap fishery which bait is used within traps comprising the steps of mixing a pelletized feed for crustaceans or non-crustaceans which feed is composed of relatively long life and digestible ingredients with an oil and at least one attractant to form said bait for said crustaceans and non-crustaceans caught in said trap.

According to still yet a further aspect of the invention, there is provided a product produced according to the foregoing method.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

It will initially be stated the bait herein discussed and described has been initially tested only under controlled conditions at the present time and has principally been tested in connection with the trapping of crustaceans, specifically lobsters. Accordingly and although the laboratory tests show promise, it must be borne in mind that the benefits and conclusions stated herein are subject to actual sea trials which are intended to be completed in due course. Further, during such testing, it has become apparent that the bait need not necessarily be limited to use with lobsters. Rather, the teachings of the invention may be applicable to crabs, prawns, shrimps and other crustaceans and, indeed, may be also useful for bait used in the trap fishery for non-crustaceans.

Figure 1A:
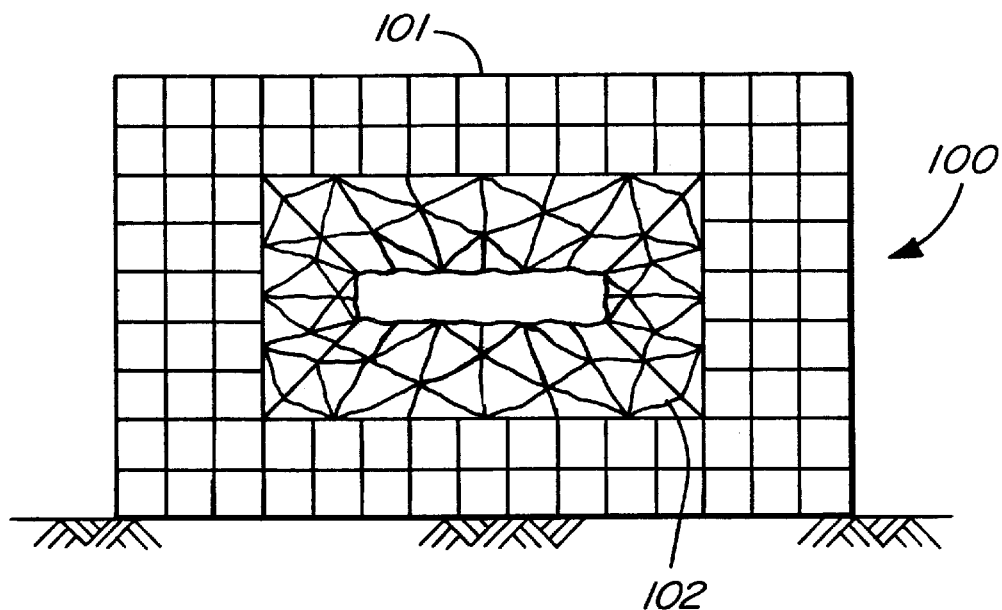
FIGS. 1A and 1B are diagrammatic front and side views, respectively, of a trap used in trap fishery with a usual mesh opening and the bait for the desired catch according to the invention being positioned within the trap.
Figure 1B:
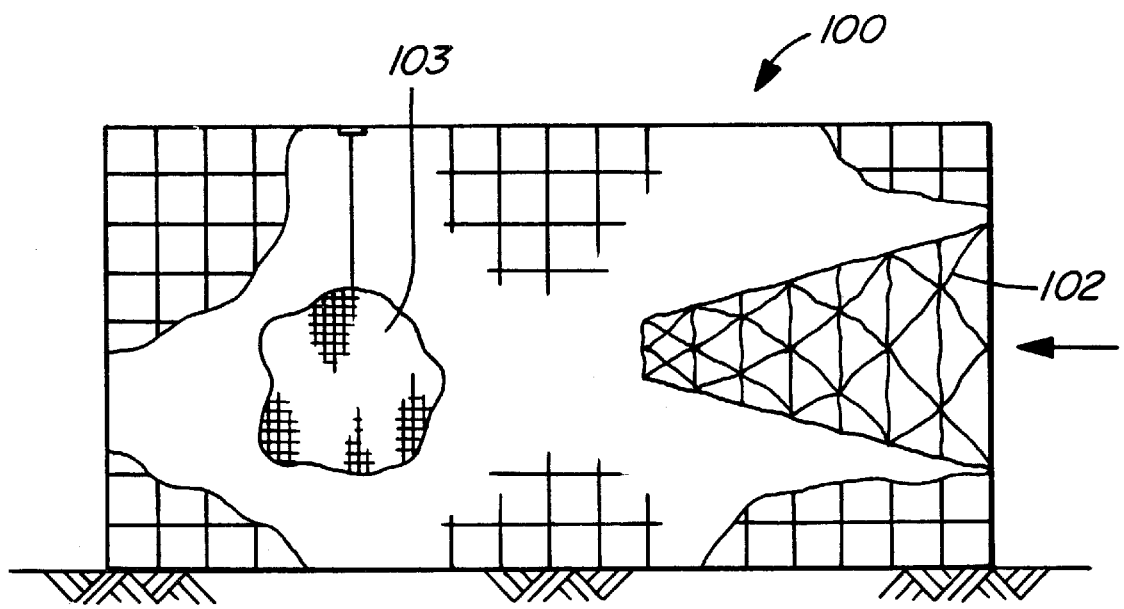

Referring to the drawings, a lobster trap is generally illustrated at 100 in FIG. 1. The lobster trap 100 used in the laboratory tests had dimensions of 55×55×35 cm and used a plastic coated wire mesh of 40 cm2. A replaceable 6 cm. stretched twine mesh was used for the entranceway 102 which had a 15 cm diameter ring sewn into one end and which formed an entryway for the lobster into the lobster trap 100 as indicated by the arrow in FIG. 1B. The lobster enters the entranceway 102 to gain access to the bait 103 which was placed in a 10×20 cm bait bag made of 3 mm (⅛ inc. mesh) nylon netting which was fastened to the top of the lobster trap 100 as illustrated in FIG. 1B.

The bait 103 used for the lobster trap 100 comprises a pelletized feed carrier which has an attractant mixed with the feed pellets. The pelletized feed carrier is made from ingredients which have an extended life under adverse conditions in salt water relative to ordinary fish feed which, when fed to fishes within an aquacultural environment, will ordinarily pass through the bottom of the enclosure in which such fishes are raised in a matter of minutes and which, therefore, is not intended for an extended life. The ingredients comprising the pellet, therefore, include whole wheat meal in the amount of 50 kg, feather meal in the amount of 50 kg, blood meal in the amount of 12.5 kg, wheat gluten in the amount of 50 kg, poultry meal in the amount of 50 kg, soybean meal in the amount of 50 kg, corn gluten meal in the amount of 50 kg, rework in the amount of 199 kg and Icelandic fish meal in the amount of 34 kg. The ingredients are mixed, extruded and cut into pellets as is well known to those skilled in the art of pelletizing feed.

Figure 2:
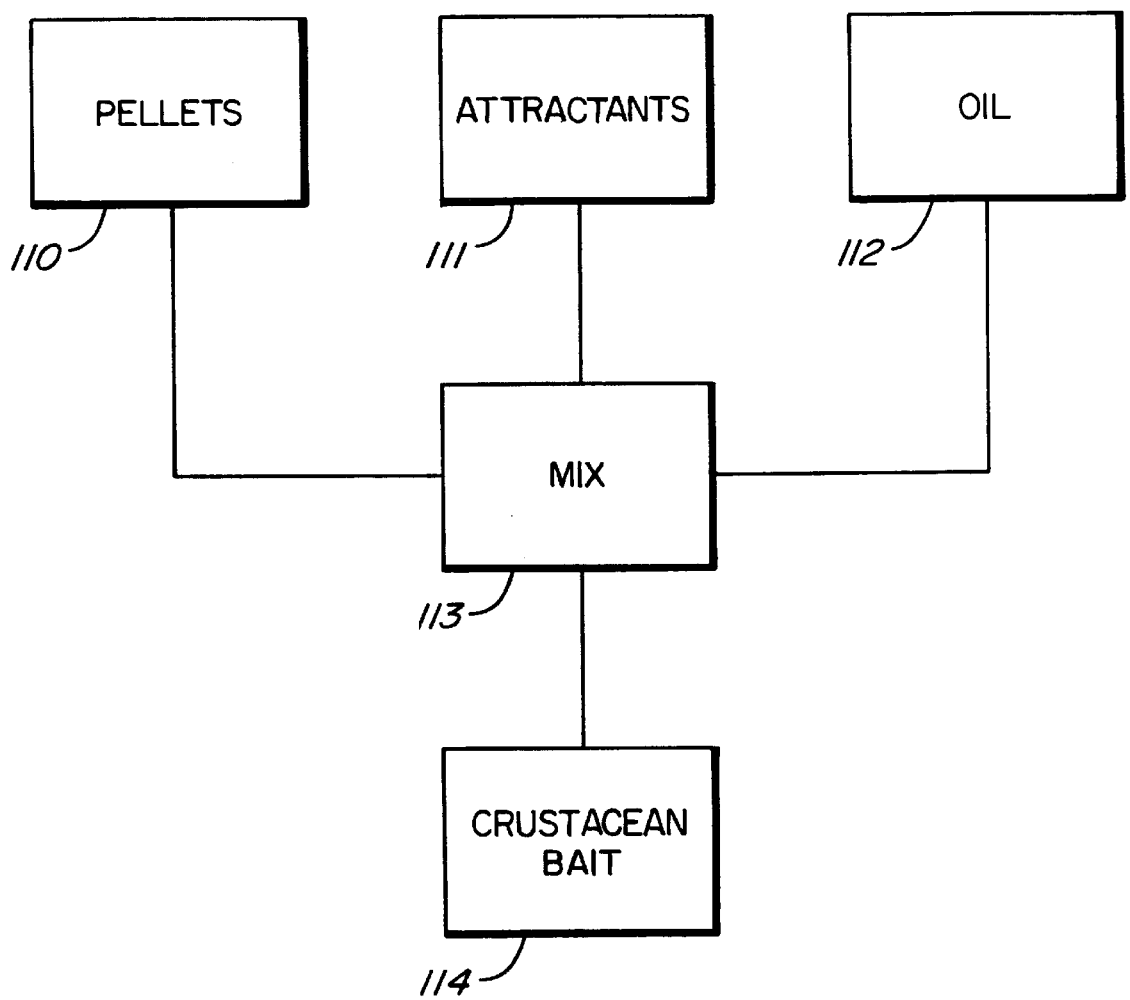
FIG. 2 is a diagrammatic block diagram illustrating the steps for producing the bait according to the invention.

The pellets 110 (FIG. 2) composed specifically for extended life are then mixed with an attractant or attractants 111. Various attractants may be used but, to date, squid meal in the quantity of 1–3 kg. per 250 kg of bait, innosine monophosphate in the quantity of 1.5–4.5 kg. per 250 kg. bait and Aquatract (composed of silica dioxide, shrimp, betaine hydrochloride, glycine, fish autolysate dehydrated) in the quantity of 1–3 kg. per 250 kg. of bait have been used with satisfactory results.

In addition to mixing the pellets of feed with the attractant, a fish oil, conveniently South American Manhaden and/or Icelandic herring oil, is added to the composition to obtain the bait 114. The fish oil 112 is applied through spray nozzles within an enclosed foreburg system at approximately 5–10 liters per 259 kg of bait. It acts to coat the pellets and the attractants 111 and therefore provides a timed release of the attractants 111 over a predetermined time period. It has been found in laboratory conditions that the attractant remained viable for a period of up to twenty-four (24) hours and could, perhaps, remain viable for a much longer period although such extended periods were not measured. Under open water operating conditions which are likely to be far more rigorous, it is anticipated that the longevity of viable timed release of the attractant would be less.

OPERATION

In operation, an appropriate quantity of the lobster feed obtained from the combination of the extended life pelletized feed 110 with the appropriate ingredients herein described, the attractant and/or attractants 111 and the fish oil coating 112 is placed in the mesh baglike container 103 and is fastened to the top of the lobster trap 100. The lobster trap 100 was then placed in position as is illustrated in FIG. 1B.

The fish oil coating 112 (FIG. 2) acts to release the attractant 111 in a timed manner over a predetermined period of time. The attractant 111 is scented by the lobster and the lobster follows the odor to the cage 100. The lobster enters the cage 100 through the mesh entranceway 102 and is unable to exit from the trap 100 as is known.

In the laboratory experiments described, the responses of lobsters were measured for various attractants 111 used with the pelletized bait 110 and fish oil 112 and this response was compared to traditional fresh herring bait. It was found that the responses of lobsters to the crustacean bait 114 compared favorably with that of traditional fresh herring bait. Similarly, the "soak times" or time under water of the bait 114 varied from six (6) to twenty-four (24) hours without a degradation of performance of the attractant 111 in the bait 114.

While the invention has been described as being particularly attractive to lobsters and, indeed, experiments have been particularly oriented to catching American lobsters, it is contemplated that the feed would be similarly useful for other lobsters such as Norway lobsters and other crustaceans such as crabs and particularly including snow (Tanner) crabs, King crabs including Alaskan King crabs, dungeness and Blue (Atlantic and Gulf Coast) crabs.

It is further contemplated that other crustaceans such as prawns and/or shrimps might usefully be caught according to the invention. Indeed, non-crustacean species that are caught with bait in a trap fishery, including fish such as Sablefish and/or Black Cod are also contemplated to be usefully caught in accordance with the teachings of the invention.

Many modifications will readily occur to those skilled in the art to which the invention relates and the specific embodiments described should be taken as being illustrative of the invention only and not as limiting its scope as defined in accordance with the accompanying claims.

We claim:

1. Bait for a trap used for catch in a trap fishery, said bait comprising a pelletized feed composed of biodegradable materials including feed having ingredients which offer extended life relative to a non-pelletized fish feed, said ingredients forming a pelletized feed, an attractant for attracting said catch of crustaceans and/or non-crustaceans and an oil coating for coating said pellets and said attractant, said oil coating allowing a timed release of said attractant thereby to attract said catch.

2. Bait as in claim 1 wherein said crustaceans include lobsters, crabs and/or prawns and said feed is a crustacean feed for said lobsters, crabs and/or prawns.

3. Bait as in claim 1 wherein said oil coating is a fish oil coating.

4. Bait as in claim 3 wherein said fish oil coating is applied through spray nozzles.

5. Bait as in claim 4 wherein said fish oil coating is added to said pelletized feed in a quantity of approximately 5–10 liters per 259 kg of said bait.

6. Bait as in claim 1 wherein said attractants include squid meal, innosine monophosphate and Aquatract.

7. Bait as in claim 6 wherein said squid meal is added in the quantity of 1–3 kg per 250 kg of quantity of said pelletized feed.

8. Bait as in claim 6 wherein said innosine monophosphate is added in the quantity of 1.5–4.5 kg. per 250 kg. of quantity of said pelletized feed.

9. Method for attracting catch to a trap used in crustacean and non-crustacean trap fishery comprising the steps of obtaining a pelletized bait consisting of a carrier made from relatively long life ingredients, at least one attractant for said catch mixed with said pelletized bait and an oil coating coating said carrier and said attractant and thereby allowing timed release of said attractant, placing said bait within said trap and setting said trap within water for attracting and trapping said crustaceans and/or non crustaceans, said carrier, said attractant and said oil coating being biodegradable.

10. Method as in claim 9 wherein said trap is a lobster trap and said bait is a crustacean bait intended to attract said lobsters.

11. Method of making a bait used in attracting catch in trap fishery which bait is used within traps, said method comprising the steps of mixing a pelletized feed for crustaceans or non-crustaceans which feed is composed of relatively long life and digestible ingredients with an oil and at least one attractant to form said bait for said crustaceans and non-crustaceans caught in said traps, said oil being a coating for said pelletized feed and said attractant, said oil, said feed and said attractant being bio-degradable materials.

12. Method of making a bait as in claim 11 wherein said oil is a fish oil.

13. Method of making a bait as in claim 12 wherein said relatively long life ingredients of said pelletized feed includes wheat meal, feather meal and blood meal.

14. Method of making a bait as in claim 13 wherein said attractant includes squid meal, innosine monophosphate and Aquatract.

15. Method of making a bait as in claim 14 wherein said squid meal is added in the quantity of 1–3 kg. per 250 kg of feed.

16. Method of making a bait as in claim 14 wherein said innosine monophosphate is added in the quantity of 1.5–4.5 kg. per 250 kg. feed.

17. Method of making a bait as in claim 14 wherein said Aquatract is added in the quantity of from 1–3 kg. per 250 kg. feed.

18. Product produced according to any one of claims 11 to 17.

* * * * *